(12) United States Patent
Kim et al.

(10) Patent No.: US 7,603,121 B2
(45) Date of Patent: Oct. 13, 2009

(54) METHOD AND SYSTEM FOR HANDOFF BETWEEN BASE STATIONS SUPPORTING MULTI-PROFILE OPERATION IN BWA SYSTEM

(75) Inventors: Jun-Hyung Kim, Seoul (KR); Geun-Hwi Lim, Seongnam-si (KR); Jung-Won Kim, Seoul (KR); Hong-Sung Chang, Suwon-si (KR); Yong Chang, Seongnam-si (KR); Joon-Ho Park, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 746 days.

(21) Appl. No.: 11/197,143

(22) Filed: Aug. 4, 2005

(65) Prior Publication Data
US 2006/0030322 A1    Feb. 9, 2006

(30) Foreign Application Priority Data
Aug. 4, 2004    (KR)    ........................ 10-2004-0061521

(51) Int. Cl.
*H04W 36/00* (2006.01)
(52) U.S. Cl. .................. 455/436; 455/437; 455/438; 455/439; 455/442; 370/331; 370/332
(58) Field of Classification Search .............. 455/436, 455/437, 438, 439, 442; 370/331, 332
See application file for complete search history.

(56) References Cited

U.S. PATENT DOCUMENTS

| 6,620,014 | B1 * | 9/2003 | Lindgren | 455/446 |
| 2002/0082019 | A1 * | 6/2002 | Sunay et al. | 455/442 |
| 2003/0017838 | A1 * | 1/2003 | Kayama et al. | 455/525 |
| 2004/0162072 | A1 * | 8/2004 | Sigle et al. | 455/436 |
| 2004/0185853 | A1 * | 9/2004 | Kim et al. | 455/438 |
| 2005/0272403 | A1 * | 12/2005 | Ryu et al. | 455/403 |

FOREIGN PATENT DOCUMENTS

| KR | 1020000039907 | 7/2000 |
| KR | 1020040041378 | 5/2004 |
| KR | 1020040061304 | 7/2004 |
| KR | 1020050107667 | 11/2005 |

* cited by examiner

*Primary Examiner*—Joseph H Feild
*Assistant Examiner*—Huy D Nguyen
(74) *Attorney, Agent, or Firm*—The Farrell Law Firm, LLP

(57) ABSTRACT

Disclosed is a method for performing handoff by a Mobile Station (MS) in a Broadband Wireless Access (BWA) communication system including a serving Base Station (BS) and at least one neighbor BS adjacent to the serving BS, the serving BS currently providing a service to the MS. The method including receiving physical layer information for communication from said at least one neighbor BS by the serving BS; combining by the serving BS the received physical layer information of said at least one neighbor BS, inserting the physical layer information into an advertisement message, and transmitting the advertisement message to the MS; and receiving by the MS the advertisement message, and performing a handoff according to the physical layer information of said at least one neighbor BS included in the advertisement message when the handoff occurs.

24 Claims, 4 Drawing Sheets

METHOD AND SYSTEM FOR HANDOFF BETWEEN BASE STATIONS SUPPORTING MULTI-PROFILE OPERATION IN BWA SYSTEM

PRIORITY

This application claims priority to an application entitled "Method and System for Handoff Between Base Stations Supporting Multi-profile Operation in BWA System" filed in the Korean Intellectual Property Office on Aug. 4, 2004 and assigned Serial No. 2004-61521, the contents of which are incorporated herein by reference.

BACKGROUND OF THE INVENTION

1. Field of the Invention

The present invention relates to a Broadband Wireless Access (BWA) system, and more particularly to a method and a system for supporting handoff between base stations (BSs) supporting different operation profiles in a BWA system.

2. Description of the Related Art

With the development of the communication industry and because of the increased demands of users who require Internet services, conventional mobile communication systems are evolving from voice-based communication systems into communication systems which are capable of efficiently providing multimedia services such as an Internet service to users in addition to existing voice-based services. Because existing mobile communication networks were developed for primarily providing voice services, existing mobile communication networks have a disadvantage in that their data transmission bandwidth is relatively narrow and consequently service charges are typically more expensive than high-bandwidth multimedia-based communication systems.

Accordingly, research is being actively pursued to develop a communication system which is capable of solving these disadvantages and can efficiently provide Internet services. A BWA system is an example of such a system.

A BWA system is a system for synthetically providing a multimedia application service including voice, as well as various (high and/or low-speed) data and dynamic high-picture-quality images. BWA communication systems are typically known as the next generation wireless communication system and can not only connect to Public Switched Telephone Networks (PSTNs), but can also connect to Public Switched Data Networks (PSDNs), the Internet, International Mobile Telecommunication (IMT)-2000 networks, Asynchronous Transfer Mode (ATM) networks, and other data communication networks Moreover, BWA communication systems can access these networks in mobile or stationary environments based on radio media using broadband of 2 GHz, 5 GHz, 26 GHz, 60 GHz, etc., and can support a channel transmission rate of more than 2 Mbps. BWA systems may be classified into a broadband wireless local loop, a broadband mobile access network and a high speed wireless Local Area Network (LAN) according to mobility (e.g., stationary or mobile) of a terminal, communication environments (e.g., indoor or outdoor) or a channel transmission rate.

A BWA scheme has been standardized by the Institute of Electrical and Electronics Engineers (IEEE) 802.16 standardization group, into a standard which is commonly known as the IEEE 802.16 standard. The BWA scheme of the IEEE 802.16 standard may change a bandwidth by adding channels or cells according to a subscriber' request for the bandwidth while a great many subscribers share transmission capacity including voice, images and data.

Currently an IEEE 802.16d and an IEEE 802.16e standard are being proposed and standardized. The IEEE 802.16d standard is obtained by integrating the IEEE 802.16 standard, the IEEE 802.16a standard and the IEEE 802.16b standard, and aims at providing a wireless Internet service to a stationary terminal. A goal of the IEEE 802.16e standard is to add mobility to the IEEE 802.16d standard which is applicable to a fixed BWA scheme.

As compared with a conventional wireless technology for a voice service, the IEEE 802.16e standard allows mass storage data to be transmitted within a short time due to a wide bandwidth of data and allows channels to be efficiently used due to the sharing of the channels by all users. Further, because Quality of Service (QoS) is ensured, users can use services having different QoSs according to service types and mobility of a mobile station (MS) is ensured by supporting handoff.

In an IEEE 802.16e system, in order to support handoff of an MS, a BS periodically broadcasts a Mobile Neighbor Advertisement (MOB_NBR_ADV) message to all MSs in a cell controlled by the BS, thereby reporting profile information of neighbor cells in advance. That is, when an MS in a cell moves to a neighbor cell, the MS can support handoff because it has BS information of the neighbor cell, which includes network identifiers (IDs) and channel characteristics already broadcasted from a BS.

An IEEE 802.16e communication system employs an Orthogonal Frequency Division Multiplexing (OFDM) scheme/an Orthogonal Frequency Division Multiple Access (OFDMA) scheme in order to support a broadband transmission network for a physical channel of the wireless system as described above.

In the IEEE 802.16e system as described above, it is generally defined that all BSs have the same operation profile. The operation profile includes characteristics such as bandwidths, sub-channel sizes, i.e., Fast Fourier Transform (FFT) sizes, and sub-channel operation modes. Accordingly, it is regarded that all MSs operate in the same operation profile when performing handoff.

However, in order to use various radio resources and efficiently allocate frequencies, a BS which can support various operation profiles is desirable. Unfortunately, when an MS uses a handoff support scheme in an existing communication system which supports the same operation profile in performing handoff between BSs supporting and using different operation profiles, the MS does not take notice of operation profiles of each BS. That is, because the MS cannot adequately perform the handoff between the BSs supporting the different operation profiles, problems such as call interruption may occur.

Further, the MS must combine operation profiles of a BS, i.e., a serving BS, including the MS, with operation profiles of a new BS, i.e., a target BS, to which the MS is to connect, and individually scan the combined operation profiles, in order to approach the new BS. Accordingly, the MS must frequently perform a scanning process for acquiring operation profiles corresponding to each BS. Therefore, reconnection set-up time may significantly increase. Further, the increase in set-up time may cause interruption of the connection. Therefore, it may be impossible to normally support handoff.

SUMMARY OF THE INVENTION

Accordingly, the present invention has been made to solve the above-mentioned problems occurring in the prior art, and it is an object of the present invention to provide a method and a system for performing handoff between base stations (BSs)

supporting different operation profiles in a cell overlap area in a Broadband Wireless Access (BWA) system.

It is another object of the present invention to provide a method and a system for performing handoff between BSs supporting different operation profiles by means of a mobile neighbor advertisement message including information of neighbor BSs.

It is further another object of the present invention to provide a method and a system for performing handoff between BSs supporting different operation profiles by broadcasting physical layer information of a neighbor BS from a BS to an MS in advance.

In accordance with one aspect of the present invention, there is provided a method for performing handoff by a Mobile Station (MS) in a Broadband Wireless Access (BWA) communication system including a serving Base Station (BS) and at least one neighbor BS adjacent to the serving BS, the serving BS currently providing a service to the MS, the method including receiving physical layer information for communication from said at least one neighbor BS by the serving BS; combining by the serving BS the received physical layer information of said at least one neighbor BS, inserting the physical layer information into an advertisement message, and transmitting the advertisement message to the MS; and receiving by the MS the advertisement message, and performing quick handoff according to the physical layer information of said at least one neighbor BS included in the advertisement message when the handoff occurs.

In accordance with another aspect of the present invention, there is provided a method for supporting by a Mobile Station (MS) handoff between BSs supporting different operation profiles in a Broadband Wireless Access (BWA) communication system including a serving Base Station (BS) and at least one neighbor BS adjacent to the serving BS, the serving BS currently providing a service to the MS, each of the BSs supporting the different operation profiles, the method including receiving physical layer information for communication from said at least one neighbor BS by the serving BS, inserting the received physical layer information into an advertisement message, and transmitting the advertisement message to the MS; and recognizing by the MS the physical layer information of said at least one neighbor BS included in the advertisement message, and performing quick handoff without an operation profile synchronization process with a predetermined neighbor BS according to physical layer information corresponding to the predetermined neighbor BS, when the handoff to the predetermined neighbor BS occurs.

In accordance with further another aspect of the present invention, there is provided a method for supporting quick handoff between a Mobile Station (MS) and a target BS in a Broadband Wireless Access (BWA) communication system including a serving Base Station (BS) currently providing a service to the MS, the target BS to which the MS is to be handed off, the method including generating by the serving BS a message including a field and transmitting the message to the MS, the field representing operation profile information in use by the target BS; receiving by the MS the message including the field from the serving BS, the field representing the BS operation profile information required for the quick the handoff; and recognizing by the MS the operation profile information for the target BS through the received message and performing the quick handoff to the target BS according to the information.

In accordance with still another aspect of the present invention, there is provided a method for performing handoff between BSs supporting different operation profiles in a Broadband Wireless Access (BWA) system, the BWA system including a Mobile Station (MS) and a serving Base Station (BS) providing a service to the MS, the method including receiving operation profile information of the neighbor BSs from the serving BS currently providing the service; selecting a handoff target cell through the operation profile information of the neighbor BSs; scanning a target BS in the handoff target cell; and terminating the service from the serving BS and receiving a service from the predetermined target BS.

In accordance with yet another aspect of the present invention, there is provided a system for supporting handoff between neighbor BSs supporting different operation profiles in a Broadband Wireless Access (BWA) system, the BWA system including a Mobile Station (MS) and a serving Base Station (BS) providing a service to the MS, the system including the serving BS for combining operation profile information corresponding to the neighbor BSs, generating a Mobile Neighbor Advertisement (MOB_NBR-ADV) message having a field, and transmitting the MOB_NBR-ADV message to the MS, the field representing the operation profile information for omitting a predetermined procedure in the handoff of the MS; the MS for receiving the MOB_NBR-ADV message including the field representing the BS operation profile information, and performing quick handoff according to the operation profile information included in the MOB_NBR-ADV message without an operation profile synchronization process for a predetermined target BS of the neighbor BSs; and the BSs for transmitting operation profile information in use to the serving BS, and providing a service required by the MS through channel synchronization in the handoff of the MS.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description of the present invention, a detailed description of known functions and configuration incorporated herein will be omitted when it may make the subject matter of the present invention unclear.

The present invention is applied to a Broadband Wireless Access (BWA) system capable of supporting a multi-profile operation, and newly defines a Mobile Neighbor Advertisement (MOB_NBR-ADV) message having physical layer information, i.e., operation profile information, of a neighbor cell, i.e., a neighbor Base Station (BS), in order to support the multi-profile operation.

Further, in the present invention, a BS broadcasts a MOB_NBR-ADV message including operation profile information of a neighbor cell to a Mobile Station (MS). Then, the MS can receive the MOB_NBR-ADV message broadcasted from the BS, and analyze and process the physical layer information, i.e., the operation profile information, of the neighbor cell included in the received message. Therefore, the MS can perform handoff between BSs supporting different operation profiles. Further, the MS can shorten the time required to access a neighbor BS using the physical layer information when performing handoff to the neighbor BS. That is, the present invention relates to a method and a system for forming handoff between BSs supporting a multi-profile operation, which can shorten access time of an MS to a BS.

Before a detailed description of the present invention is given, a BWA system for supporting a BS using a multi-profile operation will be described with reference to the accompanying drawing.

Figure 1:
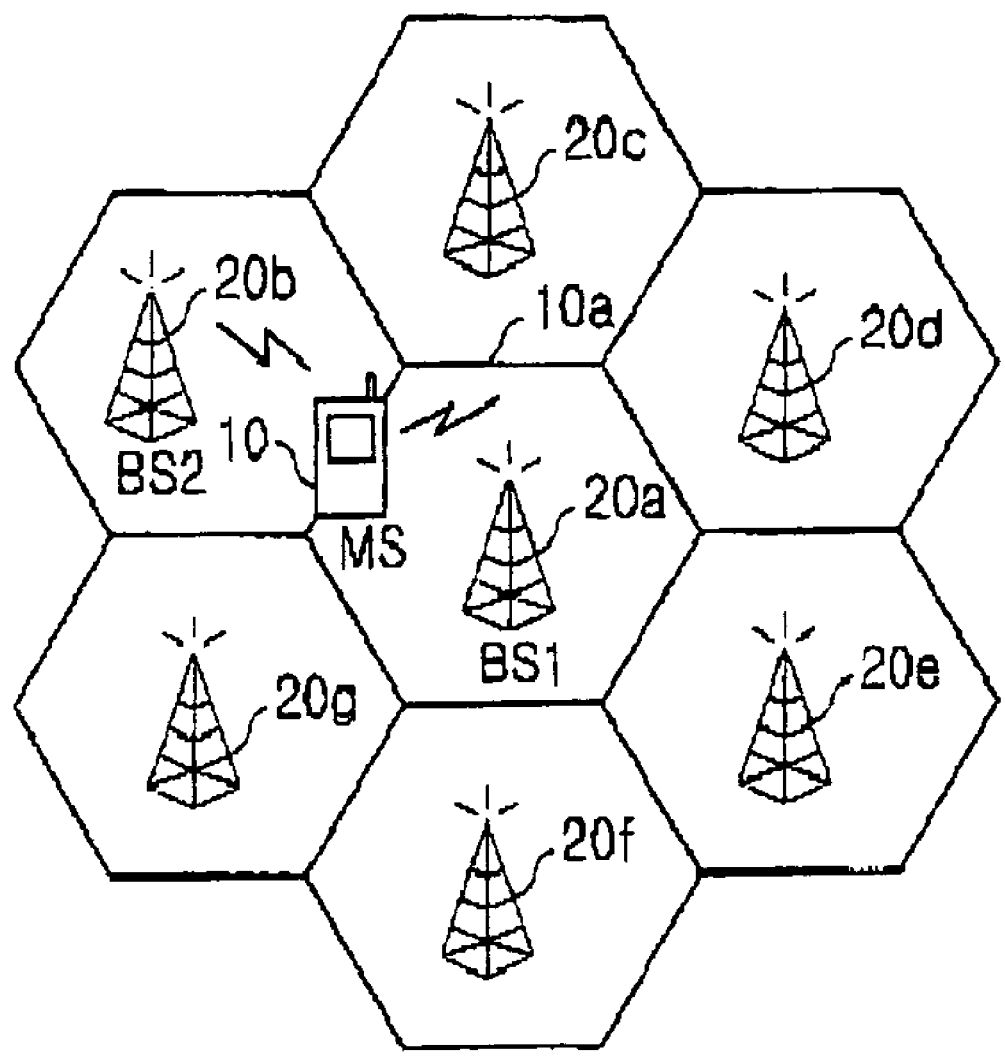
FIG. 1 is a block diagram illustrating cells constructed by BSs supporting different operation profiles in a general BWA system.

FIG. 1 is a diagram illustrating cells constructed by BSs supporting different operation profiles in a general BWA system.

Referring to FIG. 1, the BWA system includes an MS 10 and a plurality of BSs 20a to 20g supporting different operation profiles. The BSs 20a to 20g construct respective cells. It can be understood that the MS 10 moves to a handoff target BS, e.g., to the BS 20b, from a serving BS, e.g., the BS 20a, from which the MS 10 is currently receiving a service.

Hereinafter, a method for handoff between BSs supporting a multi-profile operation according to an embodiment of the present invention in the BWA system supporting the multi-profile operation as described above will be described.

First, the MS 10 receives a MOB_NBR-ADV message broadcasted from the serving BS 20a, from which the MS 10 is currently receiving a service, in advance before performing handoff. Herein, the MOB_NBR-ADV message broadcasted from the serving BS 20a includes physical layer information for BSs of neighbor cells, i.e., each BS operation information. That is, the MS 10 receives the MOB_NBR-ADV message from the serving BS 20a in advance, which additionally includes the BS operation information of the neighbor cell.

Accordingly, the MS 10 can perform handoff to the target BS 20b supporting an operation profile different from that of the serving BS 20a. Herein, when the MS 10 moves to the target BS 20b, i.e., the MS 10 performs the handoff to the target BS 20b, the MS 10 may omit an iterative scanning process for checking BS operation profile information in order to receive a service from the target BS 20b. Further, because the MS 10 has already received the neighbor BS operation information through the MOB_NBR-ADV message received from the serving BS 20a, the MS 10 may directly perform a connection set up procedure with the BS 20b when receiving only channel information of the BS 20b.

According to the embodiment of the present invention as described above, the broadcasting message, i.e., the MOB_NBR-ADV message, is newly defined in order to support the multi-profile operation of the BS in the BWA system having the above structure. The newly defined MOB_NBR-ADV message according to the embodiment of the present invention, is a broadcasting message obtained by adding the BS operation profile information to an existing MOB_NBR-ADV message so that the serving BS 20a informs the MS 10 currently receiving a service of physical layer information, i.e., operation profile information, for BSs in the neighbor cells i.e., BSs 20b to 20g. The MOB_NBR-ADV message for broadcasting the BS operation profiles according to the embodiment of the present invention has a format as shown in Table 1 below.

TABLE 1

| Syntax | Size | Notes |
|---|---|---|
| MOB_NBR-ADV_Message Format( ) { | | |
| Management Message Type=49 | 8 bits | |
| Operator ID | 24 bits | Unique ID assigned to the operator |
| Configuration Change Count | 8 bits | Change count for this message |
| N_NEIGHBORS | 8 bits | The count of the unique combination of Neighbor BS ID and Preamble Index and DCD |
| For (j=0; j<N_NEIGHBORS; j++){ | | |
| Length | 8 bits | Length of message information within N_NEIGHBORS loop in bytes |
| Neighbor BS ID | 24 bits | |
| PHY Profile ID | 16 bits | Aggregated IDs of FFT size, Bandwidth, Operation Mode of the starting subchannelization of a frame, and FA Number |
| HO Process Optimization | 8 bits | |
| Preamble Index | 8 bits | SCa and OFDMA PHY specific only |
| DCD Configuration Change Count | 8 bits | This represents the Neighbor BS current DCD configuration change count |
| UCD Configuration Change Count | 8 bits | This represents the Neighbor BS current UCD configuration change count |
| TLV Encoded Neighbor information | variable | TLV specific |
| } | | |
| } | | |

As shown in Table 1, the MOB_NBR-ADV message according to the embodiment of the present invention includes a plurality of Information Elements (IEs). That is, the MOB_NBR-ADV message includes a Management Message Type field representing types of a transmitted message, an Operator ID field representing the network identifier (ID), the Configuration Change Count field representing a configuration change count, the N_NEIGHBORS field representing the number of neighbor BSs, the Length field representing length of message information, the Neighbor BS-ID field representing IDs of the neighbor BSs, the PHY Profile ID field representing physical layer information, i.e., operation profile information, of the neighbor BSs, the HO Process Optimization field for handoff process optimization, the Preamble Index field representing a preamble index, the Downlink Channel Descriptor (DCD) Configuration Change Count field representing a configuration change count of a DCD, the Uplink Channel Descriptor (UCD) Configuration Change Count field representing a configuration change count of a UCD, and the TLV Encoded Neighbor information field representing extra information relating to the neighbor BSs in addition to the information.

As shown in Table 1, it can be understood that the MOB_NBR-ADV message according to the embodiment of the present invention further includes the PHY Profile ID field representing the physical layer information of the neighbor BSs, i.e., the BS operation profile information, as compared with the existing MOB_NBR-ADV message.

The PHY Profile ID information proposed by the present invention includes the physical layer information of the neighbor BSs, i.e., the aggregated Indicators(IDs) of the bandwidth, the Fast Fourier Transform (FFT) size representing a sub-channel size, the Sub-channel Operation Mode representing operation mode of the starting subchannelization of a frame, and the FA (Frequency Assignment) Number, etc. Herein, detailed items of the BS operation profile information, i.e., encoding information for indicating the BS operation profile, are as shown in Table 2 below.

TABLE 2

| Item | Size | Notes |
|---|---|---|
| FFT Size | 2 bits | 0b00: 2024 |
| | | 0b01: 1024 |
| | | 0b10: 512 |
| | | 0b11: 128 |
| Bandwidth | 3 bits | 0b000: 20 MHz |
| | | 0b001: 10 MHz |
| | | 0b010: 5 MHz |
| | | 0b011: 1.25 MHz |
| | | 0b100: 17.5 MHz |
| | | 0b101: 8.75 MHz |
| | | 0b110: 4.375 MHz |
| | | 0b111: 1.09375 MHz |
| Reserved | 1 bits | Reserved for future use |
| Operation Mode ID | 2 bits | 0b00: PUSC |
| | | 0b01: FUSC |
| | | 0b10: Optional FUSC |
| | | 0b11: AMC |
| FA Number | 8 bits | TBD by the service provider |

As shown in Table 2, it is possible to indicate the physical layer information of the BSs in the neighbor cells through the PHY Profile ID. That is, it is possible to indicate neighbor cell BS operation profiles through the BS operation profile information. In more detail, the PHY Profile ID for the BS operation profiles includes aggregated Indicators(IDs) of the FFT size, the bandwidth, the Reserved, the operation mode ID, and the FA Number. In the embodiment of the present invention as described above, the PHY Profile ID information is limited as the FFT size, the bandwidth, the operation mode ID, and the Channel Number. However, the scope of the present invention is not limited to these items. That is, it is natural that various physical layer information for supporting a multi-profile operation of a BS may also be included in the PHY Profile ID information, in addition to the information. For example, the PHY Profile ID information may further include a Co-located Frequency Assignment (FA) Indicator representing whether the BS(or FA) is co-located with the serving BS or not, a FA Configuration Indicator representing whether the BS has the same FA configuration (the same number of FAs as well as their frequencies) as the BS broadcasting the MOB_NBR-ADV or not, etc.

Hereinafter, a method for handoff between BSs supporting different operation profiles through the MOB_NBR-ADV message newly defined as described above will be described.

Figure 2:
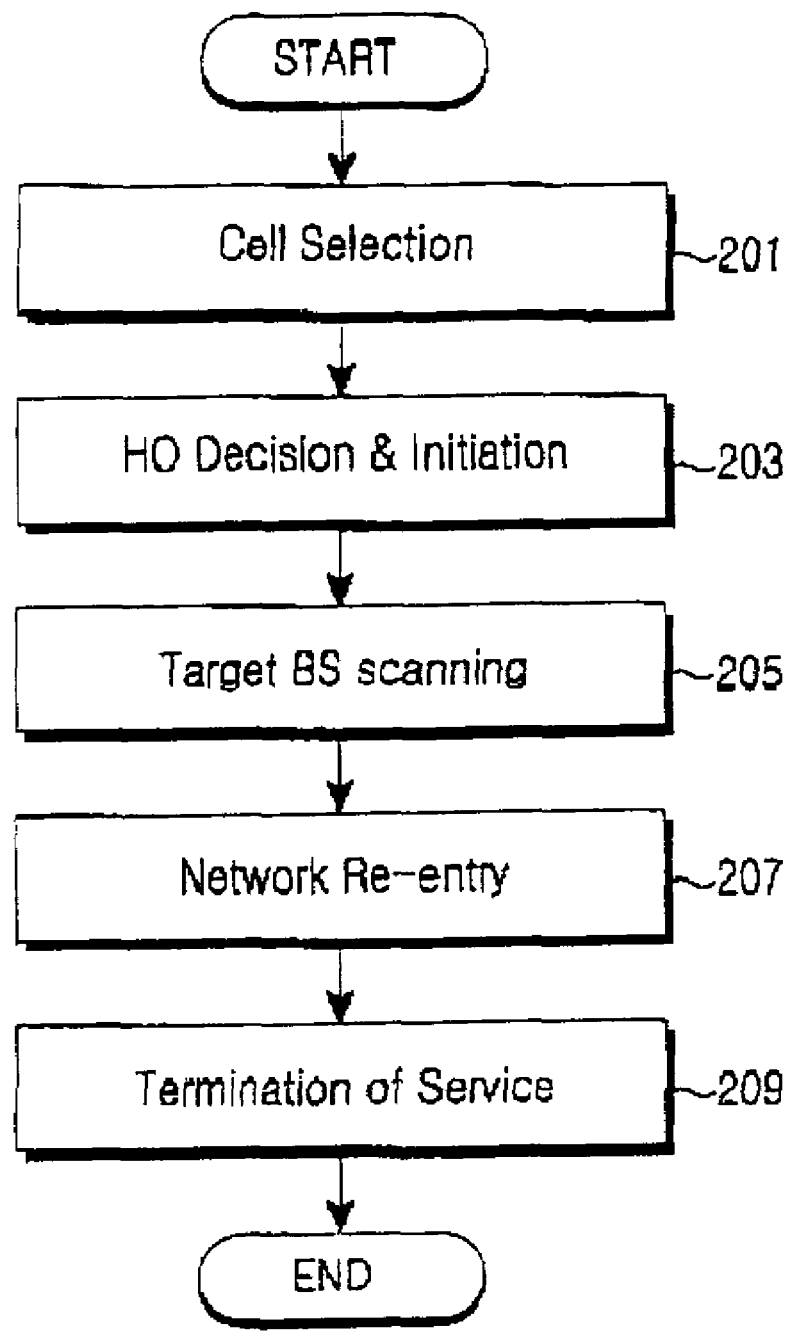
FIG. 2 is a flow chart illustrating a handoff operation in a BWA system according to an embodiment of the present invention.

FIG. 2 is a flow chart illustrating a handoff operation in the BWA system according to an embodiment of the present invention. The handoff procedure will be described using FIG. 1 as an example. Referring to FIG. 2, in step 201, when the MS 10 leaves a cell area of a serving BS, i.e., the serving BS 20a, which is currently providing a service to the MS 10, and moves to a random cell, the MS 10 performs a cell selection procedure for switching a speech path for communication into the random cell. The MS 10 has already recognized the physical layer information for the BSs 20a to 20g in the neighbor cells through the MOB_NBR-ADV message broadcasted from the serving BS 20a. When the MS 10 determines to handoff to the selected cell, the MS 10 performs an initialization process for handoff to the selected cell in step 203.

In step 205, the MS 10 scans the target BS 20b, to which the MS 10 is to be handed off, from among neighbor BSs in the selected cell. That is, the MS 10 measures the intensities of pilot channels from the BSs in the cell, and continuously compares the measured values with a threshold value of the intensity of the pilot channel of the serving BS 20a. When the comparison result at a predetermined time point corresponds to a value requiring handoff, i.e., when the intensity of a pilot channel of a predetermined BS (e.g., the target BS 20b) from among the BSs in the cell satisfies the threshold value, the MS 10 performs handoff to the target BS 20b.

In step 207, the MS 10 performs a call set up and network re-entry procedure in order to receive service from the target BS 20b. Herein, the MS 10 has already recognized the physical layer information, i.e., the operation profile information, for the target BS 20b through the already received MOB_NBR-ADV message, the MS 10 omits an operation profile synchronization procedure for the target BS 20b, etc.

In step 209, the MS 10 severs connection with the serving BS 20a and the serving BS 20a terminates service for the MS 10. Then, the MS 10 communicates with the target BS 20b to which the MS 10 has been handed off, i.e., receives a service from the target BS 20b.

Through a series of processes as described above, the MS 10 performs the handoff to a neighbor BS, e.g., the target BS 20b, from the serving BS 20a. In the embodiment of the present invention as described above, the physical layer information for the neighbor BSs is transferred to the MS 10 in advance, so that it is possible to quickly perform the handoff between the BSs supporting the different operation profiles.

However, as in the prior art, because the MS 10 has not yet recognized BS operation profiles of a neighbor cell, the MS 10 must perform the operation profile synchronization from the serving BS 20a.

Hereinafter, a process by which the MS 10 selects a cell during handoff in the BS system as described above will be described in detail through a comparison with the prior art. First, a process by which a cell is selected in a general BWA system when the BS as described above is supported will be described with reference to the accompanying drawing.

Figure 3:
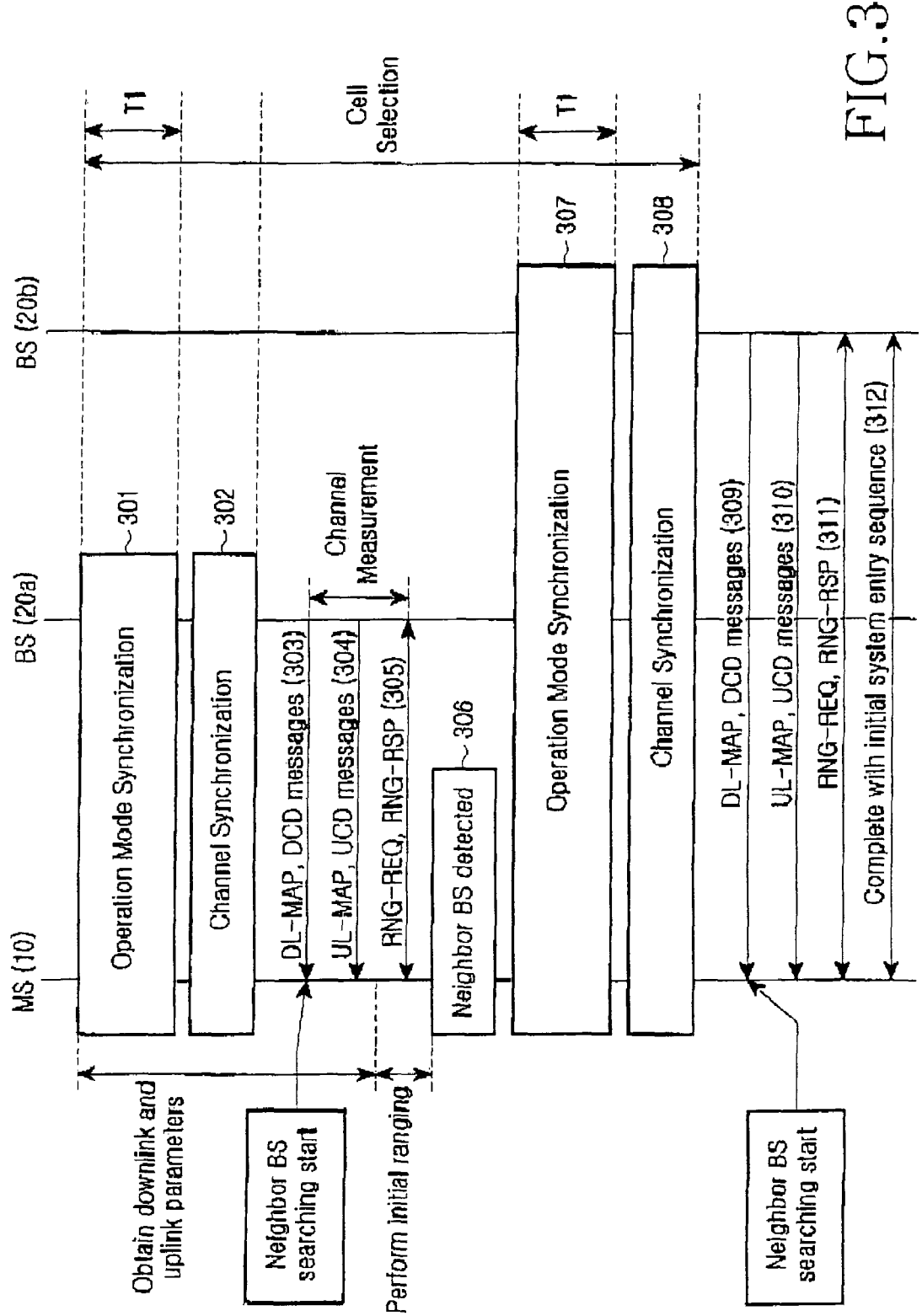
FIG. 3 is a flow diagram illustrating a call process procedure for a cell selection of an MS in a general BWA system.

FIG. 3 is a flow diagram illustrating a call process procedure for a cell selection of the MS 10 in the general BWA system.

Referring to FIG. 3, the MS 10 has not yet recognized physical layer information, i.e., BS operation profiles, for BSs in neighbor cells. Accordingly, when handoff occurs due to movement of the MS 10 from a predetermined serving BS, the MS 10 must perform operation profile synchronization with the target BS 20a for a predetermined time (T1), in step 301. For example, the MS 10 combines operation profile information such as bandwidths, FFT sizes and sub-channel operation modes and performs synchronization. Through this process, the MS 10 can achieve synchronization for an actual approach channel with the target BS 20a.

In step 302, the MS 10 performs channel synchronization for channel setting with the target BS 20a. When the channel setting operation is completed, the MS 10 receives a downlink (DL) MAP message, an uplink (UL) MAP message, a DCD (Downlink Channel Descriptor) message, and an UCD(Uplink Channel Descriptor) message from the target BS 20a in steps 303 and 304, as shown. Herein, the MS 10 starts neighbor BS searching in step 302, and performs channel measurement from steps 303 to 305. After the channel synchronization has been completed, the MS 10 transmits a ranging request (RNG-REQ) message and receives a ranging response (RNG-RSP) message to/from the target BS 20a in step 305. Through this ranging process, the MS 10 determines if the target BS 20a can continue to provide a service required by the MS 10.

When it is determined that the target BS 20a cannot provide the service to the MS 10, the MS 10 measures the intensities of pilot channels for the neighbor BSs again and finds a handoff target BS, e.g., the BS 20b, in step 306. In this case, the MS 10 must perform synchronization with the target BS 20b in another neighbor cell from the beginning. That is, in steps 307 and 308, the MS 10 repeats the operation profile synchronization and channel synchronization for the target BS 20b. From step 307 to step 308, a cell selection must be completed.

After the channel synchronization has been completed, the MS 10 receives a DL MAP message, an UL MAP message, a DCD message, and an UCD message in steps 309 and 310. Herein, the MS 10 starts neighbor BS searching.

In step 311, the MS 10 transmits a RNG-REQ message and a receives a RNG-RSP message to/from the target BS 20b. After performing this ranging process, the MS 10 sets up a connection with the target BS 20b when it is determined that the target BS 20b can satisfy the service required by the MS 10, in step 312.

In the conventional cell selection process as described above, because the MS 10 has not yet recognized the BS operation information of the neighbor cells, the MS 10 must perform the operation profile synchronization for each BS from the beginning each time. However, in the cell selection process according to the embodiment of the present invention, because the MS 10 has already recognized the physical layer information, i.e., the BS operation information, for the BSs in the neighbor cells through the MOB_NBR-ADV message periodically broadcasted from a BS, it is not necessary to perform the operation profile synchronization for each BS. Hereinafter, the cell selection process in handoff between BSs supporting this multi-profile operation according to the embodiment of the present invention will be described with reference to the accompanying drawing.

Figure 4:
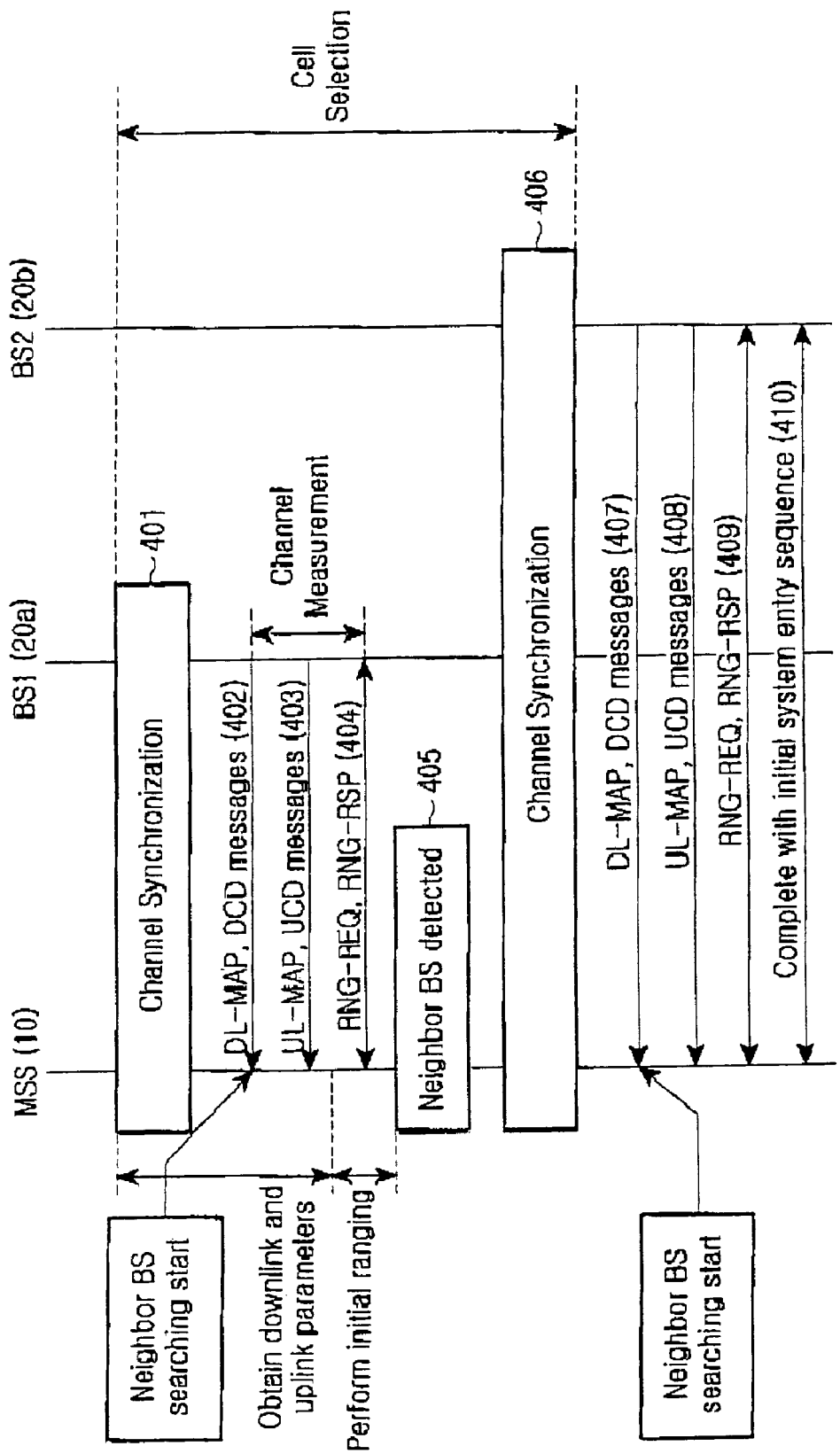
FIG. 4 is a flow diagram illustrating a call process procedure for a cell selection of an MS according to an embodiment of the present invention.

FIG. 4 is a flow diagram illustrating a call process procedure for a cell selection of the MS 10 in the BWA system according to an embodiment of the present invention. Specifically, FIG. 4 is a flow diagram illustrating the call process procedure for the cell selection when the MS 10 has already recognized operation information for BSs in neighbor cells through a MOB_NBR-ADV message broadcasted from a serving BS.

Referring to FIG. 4, the MS 10 has recognized physical layer information for neighbor BSs, i.e., operation profile information for a corresponding BS, to which the MS 10 is to be handed off, through the MOB_NBR-ADV message received from a predetermined serving BS currently providing a service to the MS 10.

In more detail, the predetermined serving BS receives and combines physical layer information of neighbor BSs adjacent to the predetermined serving BS, inserts the combined physical layer information into the periodically broadcasted MOB_NBR-ADV message, and broadcasts the MOB_NBR-ADV message to the MS 10. The MOB_NBR-ADV message and the physical layer information included in the message are shown in Tables 1 and 2. Then, the MS 10 receives the MOB_NBR-ADV message broadcast from the predetermined serving BS, and recognizes in advance the operation profile information corresponding to the neighbor BSs included in the message. Therefore, the MS 10 may omit an operation profile synchronization procedure with a handoff target BS in the cell selection process preformed during a handoff through the recognized operation profile information for the neighbor BSs. Accordingly, the MS 10 has already recognized the BS operation information of the neighbor cells, so that it is possible to omit the operation profile synchronization procedure and achieve synchronization for an actual approach channel with the target BS, e.g., the BS 20a.

In step 401, when handoff occurs due to movement of the MS 10 from a predetermined serving BS, the MS 10 directly performs channel synchronization for channel setting with the target BS 20a. When the channel setting is completed through the channel synchronization, the MS 10 receives an UL MAP message, a DL MAP message, a DCD message, and an UCD message from the target BS 20a in steps 402 and 403 as shown. Herein, the MS 10 starts neighbor BS searching, and performs channel measurement from step 402 to step 405.

After the channel synchronization has been completed, the MS 10 transmits a RNG-REQ message and receives RNG-RSP message to/from the target BS 20a in step 404. Through this ranging process, the MS 10 determines if the target BS 20a can provide a service required by the MS 10.

When it is determined that the target BS 20a cannot provide the service to the MS 10, the MS 10 measures the intensities of pilot channels for the neighbor BSs again and selects a handoff target BS, e.g., the BS 20b, in step 405. In this case, the MS 10 must perform synchronization with the target BS 20b in another neighbor cell from the beginning. However, according to the present invention, because the MS 10 has already recognized the physical layer information for all BSs in the neighbor cells as described above, the MS 10 has to directly perform only the channel synchronization in step 406.

After the channel synchronization has been completed, the MS 10 receives a DL MAP message, an UL MAP message, a DCD message, and an UCD message in steps 407 and 408. In step 407, the MS 10 starts neighbor BS searching.

In step 409, the MS 10 transmits a RNG-REQ message and receives a RNG-RSP message to/from the target BS 20b. After performing this ranging process, the MS 10 sets up a connection with the target BS 20b when it is determined that the target BS 20b can satisfy the service required by the MS 10, in step 410.

As described above, because the MS receives the operation profile information of the neighbor BSs in advance, the MS does not perform the operation profile synchronization process in the cell selection. That is, for actual operation profile synchronization, the MS must individually combine and check all operation profiles which each BS can support. Therefore, time may be unnecessarily wasted and, in the worst case, calls may be interrupted. However, in the cell selection process according to the embodiment of the present invention as described above, the operation profile synchronization for the BS is not performed in the channel synchronization. Therefore, reducing or entirely eliminating the wasting time which is caused by channel synchronization may be achieved. Further, when selectable cells increase, the gain in time may significantly increase.

According to the present invention as described above, a BWA system generates a MOB_NBR-ADV message for supporting a BS using a multi-profile operation and an MS receives the MOB_NBR-ADV message in advance, so that an operation profile synchronization procedure can be omitted in the course of selecting cells in handoff between BSs supporting the multi-profile operation. Further, according to the present invention, it is not necessary to perform the operation profile synchronization procedure, so that reconnection set up time can be reduced and call interruption can be prevented.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for supporting, by a Mobile Station (MS), a handoff between Base Stations (BSs) supporting different operation profiles in a Broadband Wireless Access (BWA) communication system including a serving BS and at least one neighbor BS adjacent to the serving BS, the serving BS currently providing a service to the MS, the method comprising:

receiving, by the serving BS, physical layer information for communication from the at least one neighbor BS;

combining, by the serving BS, the received physical layer information of the at least one neighbor BS;

inserting, by the serving BS, the physical layer information into a PHY Profile Indicator (ID) field of an advertisement message, the PHY Profile ID field indicating an operation profile for the at least one neighbor BS;

transmitting, by the serving BS, the advertisement message to the MS;

receiving, by the MS, the advertisement message; and performing the handoff according to the physical layer information of the at least one neighbor BS included in the advertisement message by performing a channel synchronization process, and without performing an operation profile synchronization process according to a cell selection process.

2. The method in claim 1, wherein the physical layer information includes Fast Fourier Transform (FFT) size indicator (ID) information representing sizes of sub-channels used by at least one neighbor BS.

3. The method in claim 1, wherein the physical layer information includes bandwidth indicator (ID) information indicating each bandwidth used by the at least one neighbor BS.

4. The method in claim 1, wherein the physical layer information includes operation mode of a starting subchannelization of a frame indicator (ID) information used by the at least one neighbor BS.

5. The method in claim 1, wherein the physical layer information includes FA (Frequency Assignment) numbers indicator (ID) information used by the at least one neighbor BS.

6. The method in claim 1, wherein the advertisement message includes a Mobile Neighbor Advertisement (MOB_NBR-ADV) message broadcasted from the serving BS.

7. A method for supporting, by a Mobile Station (MS), a handoff between Base Stations (BSs) supporting different operation profiles in a Broadband Wireless Access (BWA) communication system including a serving Base Station (BS) and at least one neighbor BS adjacent to the serving BS, the serving BS currently providing a service to the MS, the method comprising:

receiving, by the serving BS, physical layer information for communication from the at least one neighbor BS;

inserting the received physical layer information into a PHY Profile Indicator (ID) field of an advertisement message, the PHY Profile ID field indicating an operation profile for the at least one neighbor BS;

transmitting the advertisement message to the MS;

recognizing, by the MS, the physical layer information of the at least one neighbor BS included in the advertisement message; and performing the handoff with a predetermined neighbor BS according to physical layer information corresponding to the predetermined neighbor BS, by performing a channel synchronization process, and without performing an operation profile synchronization process according to a cell selection process.

8. The method in claim 7, wherein the physical layer information includes Fast Fourier Transform (FFT) size indicator (ID) information representing sizes of sub-channels used by the at least one neighbor BS.

9. The method in claim 7, wherein the physical layer information includes bandwidth indicator (ID) information indicating each bandwidth used by the at least one neighbor BS.

10. The method in claim 7, wherein the physical layer information includes operation mode of a starting subchannelization of a frame indicator (ID) information used by the at least one neighbor BS.

11. The method in claim 7, wherein the physical layer information includes FA (Frequency Assignment) numbers indicator (ID) information used by at least one neighbor BS.

12. The method in claim 7, wherein the advertisement message includes a Mobile Neighbor Advertisement (MOB_NBR-ADV) message broadcasted from the serving BS.

13. A method for supporting a handoff between a Mobile Station (MS) and a target Base Station (BS) in a Broadband Wireless Access (BWA) communication system including a sewing BS currently providing a service to the MS and the target BS to which the MS is to be handed off, the serving BS and the target BS each supporting different operation profiles, the method comprising:

generating, by the sewing BS, a message including a PHY Profile Indicator (ID) field;

transmitting the message to the MS, the PHY Profile ID field representing an operation profile in use by the target BS;

receiving, by the MS, the message including the PHY Profile ID field from the serving BS, the field representing the target BS operation profile information required for the handoff;

recognizing, by the MS, the operation profile information for the target BS through the received message; and performing the handoff to the target BS according to the information by performing a channel synchronization process, and without performing an operation profile synchronization process according to a cell selection process.

14. The method in claim 13, wherein the operation profile information includes information corresponding to a physical layer used in the target BS.

15. The method in claim 13, wherein the operation profile information includes Fast Fourier Transform (FFT) size indicator (ID) information representing sizes of sub-channels used in the target BS.

16. The method in claim 13, wherein the operation profile information includes bandwidth indicator (ID) information used by the target BS.

17. The method in claim 13, wherein the operation profile information includes operation mode of a starting subchannelization of a frame indicator (ID) information used by the target BS.

18. The method in claim 13, wherein the operation profile information includes FA (Frequency Assignment) numbers indicator (ID) information used by the target BS.

19. The method in claim 13, wherein the message including a field includes a Mobile Neighbor Advertisement (MOB_NBR-ADV) message and is broadcasted from the serving BS.

20. A method for performing handoff between Base Stations (BSs) supporting different operation profiles in a Broadband Wireless Access (BWA) system, the BWA system including a Mobile Station (MS) and a serving Base Station (BS) providing a service to the MS, the method comprising:
    receiving a message including a PHY Profile Indicator (ID) field from the serving BS currently providing the service, the PHY Profile ID field indicating an operation profile for at least one neighbor BS;
    determining if the at least one neighbor BS can provide a required service based on the operation profile;
    selecting a handoff target cell using the operation profile information of the at least one neighbor BSs, when the at least one neighbor BS can provide the required service;
    selecting a target BS in the handoff target cell;
    scanning the target BS in the handoff target cell;
    performing channel synchronization with the target BS without performing an operation profile synchronization process with the target BS;
    terminating the service from the serving BS; and
    receiving the required service from the target BS.

21. The method in claim 20, wherein the operation profile information of the target BS is included in a Mobile Neighbor Advertisement (MOB_NBR-ADV) message, which includes information relating to at least one of a bandwidth, a Fast Fourier Transform (FFT) size, a sub-channel operation mode identifier (ID) and a channel number used by the target BS.

22. A system for supporting handoff between neighbor Base Stations (BSs) supporting different operation modes in a Broadband Wireless Access (BWA) system, the BWA system including a Mobile Station (MS) and a serving Base Station (BS) providing a service to the MS, the system comprising:
    the serving BS for combining operation mode information corresponding to the neighbor BSs, generating a Mobile Neighbor Advertisement (MOB_NBR-ADV) message having a PHY Profile Indicator (ID) field, and transmitting the MOB_NBR-ADV message to the MS, the PHY Profile ID field representing the operation mode information for omitting a predetermined procedure in the handoff of the MS;
    the MS for receiving the MOB_NBR-ADV message including the PHY Profile ID field representing the BS operation mode information, and for performing a handoff according to the operation mode information included in the MOB_NBR-ADV message for a predetermined target BS of the neighbor BSs by performing a channel synchronization process, and without performing an operation profile synchronization process according to a cell selection process; and
    the neighbor BSs for transmitting operation mode information in use to the serving BS, and providing a service required by the MS through the channel synchronization process in the handoff of the MS.

23. The system in claim 22, wherein the operation mode information includes physical layer information used by the neighbor BSs.

24. The system in claim 22, wherein the operation mode information includes at least one of a bandwidth, a Fast Fourier Transform (FFT) size representing a sub-channel size, a sub-channel operation mode identifier (ID) and a channel number.

* * * * *

UNITED STATES PATENT AND TRADEMARK OFFICE
CERTIFICATE OF CORRECTION

PATENT NO. : 7,603,121 B2  Page 1 of 1
APPLICATION NO. : 11/197143
DATED : October 13, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1088 days.

Signed and Sealed this

Fourteenth Day of December, 2010

David J. Kappos
*Director of the United States Patent and Trademark Office*